(12) United States Patent
Ezell et al.

(10) Patent No.: US 8,867,717 B2
(45) Date of Patent: Oct. 21, 2014

(54) DYNAMIC DEVICE PAIRING WITH CONTROL SESSION ESTABLISHMENT

(71) Applicant: Avaya Inc., Basking Ridge, NJ (US)

(72) Inventors: Joel M. Ezell, Broomfield, CO (US); Ming Hou, Belleville (CA); Stephen Durney, Broomfield, CO (US)

(73) Assignee: Avaya Inc., Basking Ridge, NJ (US)

(*) Notice: Subject to any disclaimer, the term of this patent is extended or adjusted under 35 U.S.C. 154(b) by 0 days.

(21) Appl. No.: 13/794,271

(22) Filed: Mar. 11, 2013

(65) Prior Publication Data

US 2014/0254785 A1 Sep. 11, 2014

(51) Int. Cl.
*H04M 3/42* (2006.01)
*H04M 3/54* (2006.01)

(52) U.S. Cl.
CPC ............................... *H04M 3/54* (2013.01)
USPC .................. 379/201.01; 379/221.08; 379/229

(58) Field of Classification Search
USPC ................................. 379/201.01, 221.08, 229
See application file for complete search history.

(56) References Cited

U.S. PATENT DOCUMENTS

| 2009/0262908 | A1* | 10/2009 | Choi et al. | 379/87 |
| 2011/0289203 | A1 | 11/2011 | Braudes et al. | |
| 2012/0195303 | A1 | 8/2012 | Pujic | |
| 2013/0086618 | A1* | 4/2013 | Klein et al. | 725/80 |

OTHER PUBLICATIONS

U.S. Appl. No. 13/595,626—Method and Apparatus for Dynamic Device Pairing.
U.S. Appl. No. 13/626,232—System and Method for Enabling Hot-Desking.

* cited by examiner

*Primary Examiner* — Quynh Nguyen
(74) *Attorney, Agent, or Firm* — Sheridan Ross P.C.

(57) ABSTRACT

A communication system, method, and components are described. Specifically, a communication method is disclosed which enables a media device and control device to be dynamically paired to one another and a control link call to be established between the media device and the control device. The control link call can be utilized to permit the media device to be controlled by the control device while the media device exchanges media with a communication device operated by another user.

20 Claims, 5 Drawing Sheets

DYNAMIC DEVICE PAIRING WITH CONTROL SESSION ESTABLISHMENT

FIELD OF THE DISCLOSURE

The present disclosure is generally directed toward communications and more specifically toward unified communications.

BACKGROUND

It is often advantageous to allow a user of a communication system to access different communication devices. For example, a user associated with a desk phone in the user's office may wish to access a phone in a different room. As a further example, users may have need of different communication capabilities for different communications, and those capabilities may be best supported by different communication devices. In such situations, it is often desirable to present the device used to support the communication (e.g., the media stream) to other communication devices and/or the communication system as the user's personal device. Similar situations arise when advanced call control is desired from a softclient running on a computing device.

Systems have been developed that allow a user to forward calls from a communication device associated with a communication address, to an alternate communication device. However, communications placed from the alternate device are typically not presented to called parties as being associated with the communication address of the user's primary device. In addition, communications conducted in connection with an alternate device using call forwarding are generally made without the application of call features or restrictions associated with the primary device.

Still other systems have been developed that pair an alternate device to a user's primary device. For example, systems have been developed to support telecommuters, to enable users to present a consistent communication address to called and calling parties. However, such systems suffer from deficiencies with respect to the application of calling features and restrictions. For example, where pairing is accomplished by a mechanism outside of a server responsible for applying other features and restrictions, that other server may be unaware of a pairing that has been implemented. As a result, the features and restrictions applied to a call involving paired devices may be those associated with a paired device, rather than a pairing device or both the pairing and paired devices. This can in turn result in a failure to apply restrictions that should be enforced with respect to the call and/or in desired features being unavailable.

SUMMARY

A Method and Apparatus for Dynamic Device Pairing has been developed and described in U.S. patent application Ser. No. 13/595,626, filed Aug. 27, 2012, the entire contents of which are hereby incorporated herein by reference. This Dynamic Device Pairing seeks to present the paired and pairing devices as one to the outside world. As a result, the provision of features can be maintained, even when a pairing operation has been performed. Additionally, it is desirable to implement this feature with minimal impact on the pairing endpoint. It should be able to signal as it normally does if it is a full participant in the call without knowing whether the pairing feature is applied by a feature server. It is also desirable that this feature addition allows pairing from somewhere other than the desk of the end user and as an on-demand option.

Difficulties arise during Dynamic Device Pairing when a call is initially placed by the paired or media device (e.g., the device being controlled by the pairing device). Specifically, calls initiated at the paired device may not necessarily be controllable from the paired device as they would have been if the pairing device initiated the call. Additionally, the calling identity may not necessarily represent that of the user that is using the pairing device. Rather, the calling identity may be associated with some arbitrary user or room that has been tied to or associated with the paired device.

Embodiments of the present disclosure propose a Dynamic Device Pairing solution whereby the paired device (e.g., a media device) initiates a call, but the caller's identity is changed from an identity associated with the media device to an identity that is associated with the pairing device (e.g., a control device that is controlling the media device). Another aspect of the present disclosure is to establish a control session between the media device and the control device, thereby enabling the control device to control operations of the media device during the communication session, even though the communication session was initiated at the media device.

In some embodiments, the above aspects can be achieved by utilizing a Dynamic Device Pairing (DDP) application. The DDP application may be automatically sequenced as a sequenced application for all potential media devices. In some embodiments, the DDP application may be sequenced as a default application for every outbound call initiated at a media device.

In some embodiments, the DDP application may provisioned as an orig-sequenced application for all potential media devices. It should be noted that if the media device initiating a call corresponds to a non-SIP device, then the media device may need to have "Exposed Local Calling" enabled on its primary feature server so that the appropriate server(s) responsible for sequencing the DDP application will see all calls initiated by that device and can then invoke the DDP application as appropriate. Additional details of Exposed Local Calling are described in U.S. Patent Publication No. 2012/0195303, filed May 24, 2011, the entire contents of which are hereby incorporated herein by reference.

In some embodiments, the user initiates a call on the media device. The initiation of the call causes the media device to generate and send an INVITE message, which initially contains an SDP offer from the media device and has the media device caller ID (e.g., PAI/From header is that of the media device).

A server configured to sequence a DDP application may, upon receiving the INVITE message, invoke the orig sequence for the media device, which minimally includes a DDP application. Upon receiving the INVITE message, the DDP application may check to see if the PAI of the called device matches an address of a user that has paired their control device with the called media device identified in the PAI. If there is no match, then the DDP application may be allowed to proxy the call along without further modification.

On the other hand, if the DDP application identifies a match, then additional processing steps may be executed. Specifically, the DDP application may send an INVITE to the user's address that is operating the control device. This INVITE will have a special tag on it that indicates this is a control link call. In the situation of a control link call, special behaviors may need to be defined for sequenced applications involved in the control link call. For instance, a recording application probably would not need to record media on a control link call because it would already be sequenced on the other leg of the call between the users. The DDP application itself may be term sequenced on this control link call and may have to know not to act on it because the DDP application is already performing the necessary functions on the primary call between users.

The INVITE transmitted by the DDP application will also have an SDP of a=inactive. The control device can then respond to the INVITE message with a provisional response (e.g. 180) that includes a tag indicating that it is DDP-capable. The DDP application, upon receiving the provisional response from the control device, can then send an OOD-REFER with an "Answer Call" directive causing the control device to automatically answer the call. It should also be noted that an INVITE with the auto-answer directive could also have been used.

At this point, a control session has been established between the control device and the media device for the communication session initiated by the media device. The DDP application then turns its attention back to the original INVITE. In some embodiments, the DDP application will send a new INVITE with PAI/From information populated with the identity of the user operating the control device and the SDP offer from the media device. In other words, the new INVITE has the original SDP offer, but has an altered PAI/From Header that now identifies the calling party as the user associated with the control device—not a user or room associated with the media device. If any additional applications are required, the sequencing server may receive the INVITE from the DDP application and sequence any applications per the sequencing preferences of the user associated with the control device. In some embodiments, it may occur that the DDP application may be sequenced for a communication session more than once (e.g., once on the main call session and once for the control link call). It may be useful to mark the new INVITE with information that instructs the DDP application to not act on the new INVITE message when it is sequenced into the control link call.

The end result is that a media path is established between the media device and the called endpoint, but there is a control session between the control device and media device for controlling the communications between the media device and the called endpoint. This ultimately results in exactly the same call topology and capabilities as if the call had been initiated by the control device.

In other embodiments, a similar call-control session can be established between a control device and a media device for calls directed toward the media device. In other words, a call-control session as described herein can be established when a call is initially directed toward a device other than a control device, but the target device is paired to the control device via a DDP application.

In accordance with at least some embodiments of the present disclosure, a method of facilitating a communication session between a first user and a second user is provided, the method comprising:

receiving a first call-establishment message, the first call-establishment message being at least one of generated by and directed toward a media device;

in response to receiving the first call-establishment message, determining that the media device is paired with a control device associated with the first user;

temporarily establishing a control link call between the media device and the control device; and enabling the media device to be controlled by the control device via the control link call while the media device exchanges media with a communication device operated by the second user.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
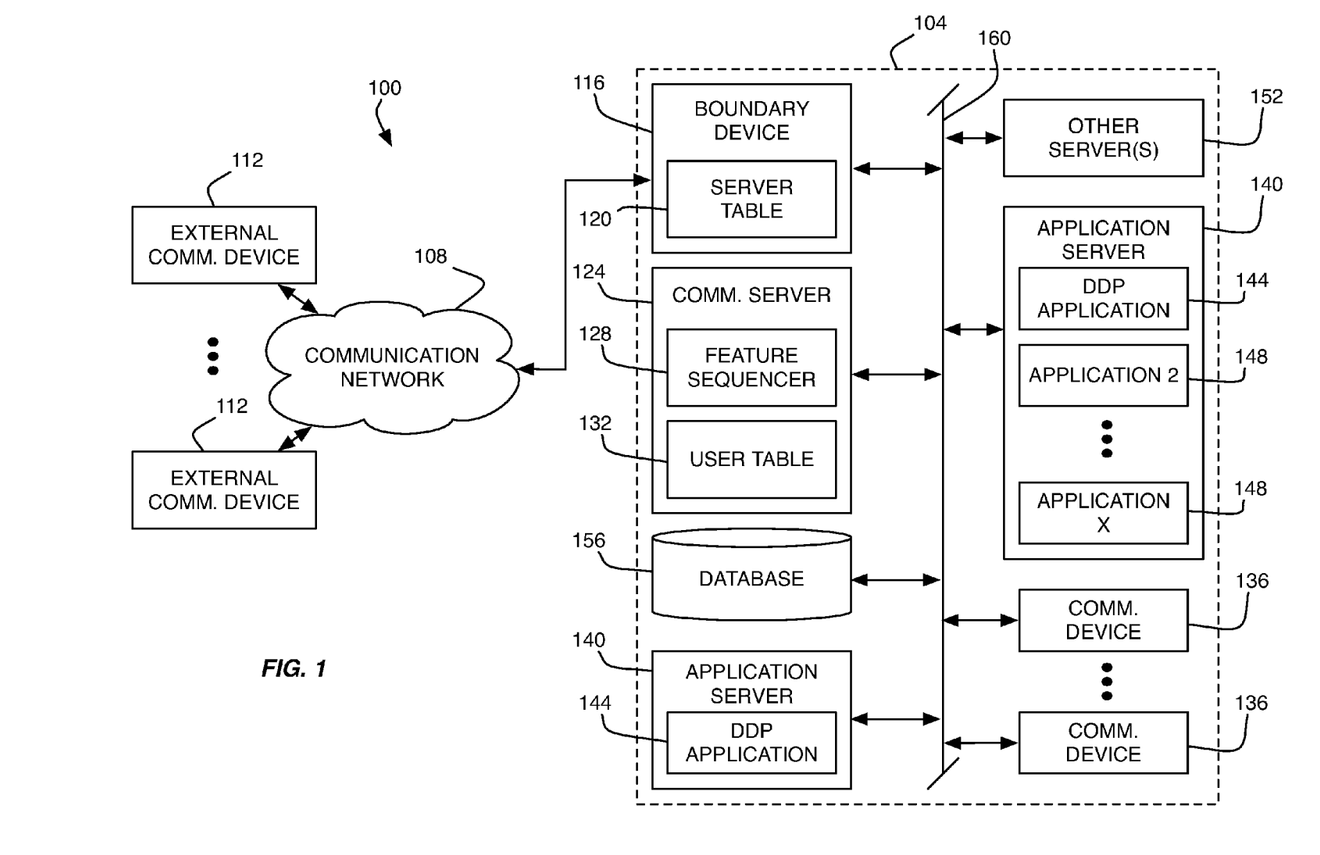
FIG. 1 is a block diagram of a communication system in accordance with embodiments of the present disclosure.

With reference initially to FIG. 1, a communication system 100 will be described in accordance with embodiments of the present disclosure. The communication system 100 is depicted as including an enterprise network 104 that is connected to one or more external communication devices 112 via a communication network 108. Components of the enterprise network 104 are depicted as including a network boundary device 116, a communication server 124, a plurality of communication devices 136, one or more application servers 140 having one or more applications 144, 148, other servers 152, and an enterprise database 156. It should be appreciated that one or more of the components depicted as being within the enterprise network 104 may alternatively or additionally be provided outside the enterprise network 104.

In some embodiments, the communication network 108 may correspond to any type of known communication network. Examples of a suitable communication network 108 include, without limitation, the Internet, the Public Switched Telephone Network (PSTN), a cellular network, an IMS network, an ISDN network, any other packet-switched network, any other circuit-switched network, or combinations thereof. In one configuration, the communication network 108 is a public network supporting the TCP/IP suite of protocols.

The external communication devices 112 are generally referred to as "external" because they are either not under the direct control of the enterprise administering the enterprise network 104 or have a decreased level of trust with the enterprise network 104 as compared with communication devices 136 that are within the enterprise network 104. Exemplary types of external communication devices 112 include, without limitation, cellular phones, laptops, tablets, Personal Computers (PCs), Personal Digital Assistants (PDAs), digital phones, analog phones, and the like.

The communication devices 136 within the enterprise network 104, similar to the external communication devices 112, may correspond to user communication devices and, in some embodiments, may correspond to a UA or multiple UAs of enterprise users. Examples of communication devices 136 include, without limitation, a telephone, a softphone, a cellular phone, a multi-speaker communication device (e.g., conference phone), a video phone, a PC, a laptop, a tablet, a PDA, a smartphone, a thin client, or the like. It should be appreciated that a communication device 136 may be configured to support single or multi-user interactions with other communication devices 136 within the enterprise network 104 as well as other communication devices 112 that are external to the enterprise network 104.

The communication devices 112, 136 may include any collection of components (hardware and/or software) that enable users to exchange media (e.g., voice, video, etc.), data (e.g., emails, Short Message Service (SMS) messages, Multimedia Message Service (MMS) messages, files, presentations, documents, etc.), and the like with one another's communication devices over the communication network 108 and/or within the enterprise network 104.

The enterprise network 104 may correspond to either a single-location enterprise network or a multi-location enterprise network. A single-location enterprise network may comprise a network backbone 160 that corresponds to a Local Area Network (LAN) that includes wired (e.g., Ethernet) and/or wireless (e.g., Wi-Fi) technologies. A multi-location enterprise network may comprise a network backbone 160 that is a Wide Area Network (WAN), which connects a plurality of LANs or similar network locations via one or more untrusted networks, such as the communication network 108.

In some embodiments, the network boundary device 116 is provided to separate the external communication devices 112 and the untrusted communication network 108 from the network backbone 160 and components contained within the enterprise network 104. As an example, the network boundary device 116 operates to secure the enterprise network 104 from malicious attacks from the communication network 108. Examples of a network boundary device 116 include, without limitation, a Session Border Controller (SBC), a gateway, a Network Address Translation (NAT) device, a firewall, a router, or any other collection of hardware and/or software that performs one or more functions such as filtering, protocol translation/mapping, impedance matching, rate conversion, fault isolation, signal translation, encryption, packet tunneling, etc. as necessary to provide interoperability and/or security for the enterprise network 104.

As shown in FIG. 1, the boundary device 116 includes a server table 120. The server table 120 may correspond to any data structure or collection of data structures that enables the boundary device 116 to appropriately route messages from the external communication devices 112 to one or more communication servers 124 of the enterprise network 104. Specifically, while the enterprise network 104 is only depicted as having a single communication server 124, it should be appreciated that some enterprise networks 104 may comprise a plurality of communication servers 124 and each of those servers may be authoritative for (e.g., provide services for) a subset of enterprise users. In such a scenario, messages received at the boundary device 116 will be routed to the appropriate communication server 124 by referring to entries in the server table 120 that may define which communication server 124 is authoritative for an enterprise user that is a target of the received message.

In some embodiments, the communication server 124 may be used to help establish communication sessions and/or move signaling paths, change call topology, etc. Specifically, the communication server 124 may include a Private Branch eXchange (PBX), an enterprise switch, an enterprise server, combinations thereof, or any other type of telecommunications system switch or server. The communications server 124 is, in some embodiments, configured to execute telecommunication functions such as the suite of Avaya Aura™ applications of Avaya, Inc., including Communication Manager™, Avaya Aura Communication Manager™, Avaya IP Office™, Communication Manager Branch™, Session Manager™, System Manager™, MultiVantage Express™, and combinations thereof.

As noted above, although only a single communications server 124 is depicted in FIG. 1, two or more communications servers 124 may be provided in a single enterprise network 104 or across multiple separate LANs 160 owned and operated by a single enterprise, but separated by the untrusted communication network 108. In configurations where an enterprise or an enterprise network 104 includes two or more communications servers 124, each server 124 may comprise similar functionality, but may be provisioned for providing its features to only a subset of all enterprise users. In particular, a first communications server 124 may be authoritative for and service a first subset of enterprise users whereas a second communications server 124 may be authoritative for and service a second subset of enterprise users, where the first and second subsets of users generally do not share a common user.

Additionally, multiple servers 124 can support a common user community. For example, in geo-redundant and other applications where users aren't necessarily bound to a single application server, there may be a cluster of equivalent servers where a user can be serviced by any server in the cluster.

A communications server 124 can be configured to include user communication preferences in a user table 132, which map, for a corresponding (enterprise subscriber) user, to a set of communication preferences to be invoked for an incoming and/or outgoing contact for each user for whom it is authoritative. Even more specifically, communications between internal enterprise users (e.g., internal communication devices 136) may first be serviced by the originating user's authoritative communications server 124 during the origination phase of communications set-up. After the origination phase is complete, the authoritative communications server 124 of the terminating (or called) user may be invoked to complete the termination phase of communications set-up. In some embodiments, the communications server 124 for the originating and terminating user may be the same, but this is not necessarily required. In situations where more than two enterprise users are involved in a communication session, authoritative communications servers 124 for each of the involved users may be employed without departing from the scope of the present invention. Additionally, the authoritative communications servers 124 for each user may be in the same enterprise network 104 or in different enterprise networks 104, which are owned by a common enterprise but are separated by an untrusted communication network 108.

In accordance with at least some embodiments of the present disclosure, the communication sever 124 may include a feature sequencer 128 that is configured to instantiate the communication preferences for a calling and/or called user, regardless of whether or not the calling and/or called user are using an external communication device 112 or internal communication device 136. In some embodiments, the user communication preferences in the user table 132 may be provisioned by users and/or by administrative personnel. The communications preferences for a particular user are referenced by the feature sequencer 128 to determine which, if any, features should be incorporated into a communication session for the user. The feature sequencer 128 can actually provide communication features directly into the communication session or the feature sequencer 128 can determine an application sequence which will be invoked during set-up and used during the communication session. As can be appreciated, the application sequence can be set-up for new communication sessions or communication sessions in which two or more devices (e.g., communication devices 136) are dynamically paired together.

In accordance with at least some embodiments, the communication server 124 can determine an application sequence and cause one or more applications 144, 148 to be sequenced into a communication session. In other embodiments, the communication server 124 may sequence a particular application or set of applications (e.g., DDP application 144) for any call initiated at a particular communication device 136. For instance, if a communication device 136 is identified in the user table 132 as always needing the DDP application 144 sequenced, then any calls initiated at that communication device 136 may have the DDP application 144 sequenced on the origination phase of call setup.

In some embodiments, the communication server 124 is configured to analyze a particular user's communication preferences as defined in the user table 132 and invoke the necessary applications 144, 148 to fulfill such preferences. Once an application sequence is determined for a calling and/or called user (or a call-initiating device), the communications server 124 passes the communication-establishing message (e.g., an INVITE message) to a first application in the application sequence, thereby allowing the first application to determine the parameters of the communication session, insert itself into the control and/or media stream of the communication session, and thereby bind itself to the communication session. As noted above, if the call is initiated at a predetermined communication device 136 (e.g., an "always paired device", an "often paired device", a conference endpoint in a conference room, etc.), then the first application sequenced for that device 136 may correspond to the DDP application 144. The DDP application 144, in some embodiments, may be configured to execute similar functionality for calls directed toward a predetermined communication device 136 that is paired to another device for control purposes.

Once the first application has inserted itself into the communication session, the first application either passes the communication-establishing message back to the communication server 124 to identify the next application in the application sequence or passes the communication-establishing message directly to a second application in the application sequence. Alternatively, or in addition, the message may be redirected, rejected, or the like. Moreover, parties and/or media servers may be added to the call by an application. As can be appreciated, this process continues until all applications have been included in the communication session and the process can be duplicated for each of the users involved in the communication session.

Although only a single application server 140 is depicted, one skilled in the art will appreciate that one, two, three, or more application servers 140 can be provided and each server may be configured to provide a single application or a set of applications 144, 148. The applications provided by a particular application server 140 may vary depending upon the capabilities of the server 140 and in the event that a particular application server 140 comprises a set of applications 144, 148, one, some, or all of the applications in that set of applications 144, 148 may be included in a particular application sequence. There is no requirement, however, that all applications in a set of applications 144, 148 be included in an application sequence and there is no requirement as to the order in which applications are included in the application sequence. Rather, the application sequence is usually determined based on a user's communication preferences, which can be found in the user communication preferences table 132. Alternatively, or in addition, the applications that appear in a users sequence vector and their order within that vector may be determined by a system administrator to satisfy business requirements.

Moreover, the application sequence can vary based on the media type(s) that are being used in the communication session. For instance, a user may have a first set of preferences for voice-based communications, a second set of preferences for video-based communications, and a third set of preferences for text-based communications. Additionally, a user may have preferences related to invoking and enabling communication sessions where the user utilizes two or more devices that have been dynamically paired to one another (e.g., where one device is used to receive a first media type, such as voice, and another device is used to receive a second media type and/or control information). For instance, a user may define within the user table 132 that the DDP application 144 may be invoked for any outbound calls initiated by the user with a certain communication device 136. Similarly, a user may define that a DDP application 144 may be invoked within an application server 140 for certain types of inbound calls directed toward the user.

The applications included in a particular application sequence are generally included to accommodate the user's preferences. Applications 148 may vary according to media-type, function, and the like. One specific type of application that will be discussed in further detail herein is a DDP application 144. Other suitable types of applications 148 include, without limitation, an EC-500 (extension to cellular) application, a call-setup application, a call-recording application, a voicemail application, an email application, a voice application, a video application, a text application, a conferencing application, a communication log service, a security application, an encryption application, a collaboration application, a whiteboard application, mobility applications, presence applications, media applications, messaging applications, bridging applications, and any other type of application that can supplement or enhance communications. Additionally, one, two, three, or more applications 144, 148 of a given type can be included in a single application sequence without departing from the scope of the present invention.

In some embodiments, when the communication server 124 includes one or more applications 144, 148 in a communication session, those applications may be configured to behave as a Back-to-Back UA (B2BUA). When an application 144, 148, or any other communication element, behaves as a B2BUA, the application inserts itself in the control signaling path so that it can maintain complete call state and participate in all call requests.

One or more applications 144, 148 within the application server 140 may be configured to invoke or employ a media server to help execute the functionality defined for that function. For instance, a media server may be employed for an IVR application.

The other servers 152 may include any other type of server or switch needed for operating the enterprise network 104. Examples of suitable other servers 152 include, without limitation, presence servers, Instant Messaging (IM) servers, email servers, voicemail servers, virtual machines, web servers, call center servers, Interactive Voice Response (IVR) units, etc.

The enterprise database 156 may include information regarding enterprise users and/or non-enterprise users. Specifically, the enterprise database 156 may comprise information that identifies enterprise users, their relative position within the enterprise hierarchy, network permissions, communication permissions, Customer Relationship Management (CRM) information, etc. The enterprise database 156 may be any type of data storage system and may include one or more hierarchical databases, relational databases, or any other type of known database structure such as a SQL database. The enterprise database 156, although depicted as being separate from the user communication preferences table 132 in the communication server 124, may comprise the data regarding user communication preferences 132 and may be accessible to the communication server 124 via a database lookup or query/response protocol.

It should be appreciated that some or all of the functions depicted in FIG. 1 may be co-hosted and/or co-resident on a single server. The depiction of components in FIG. 1 is generally intended to be a logical depiction of the components of the system 100.

Figure 2:
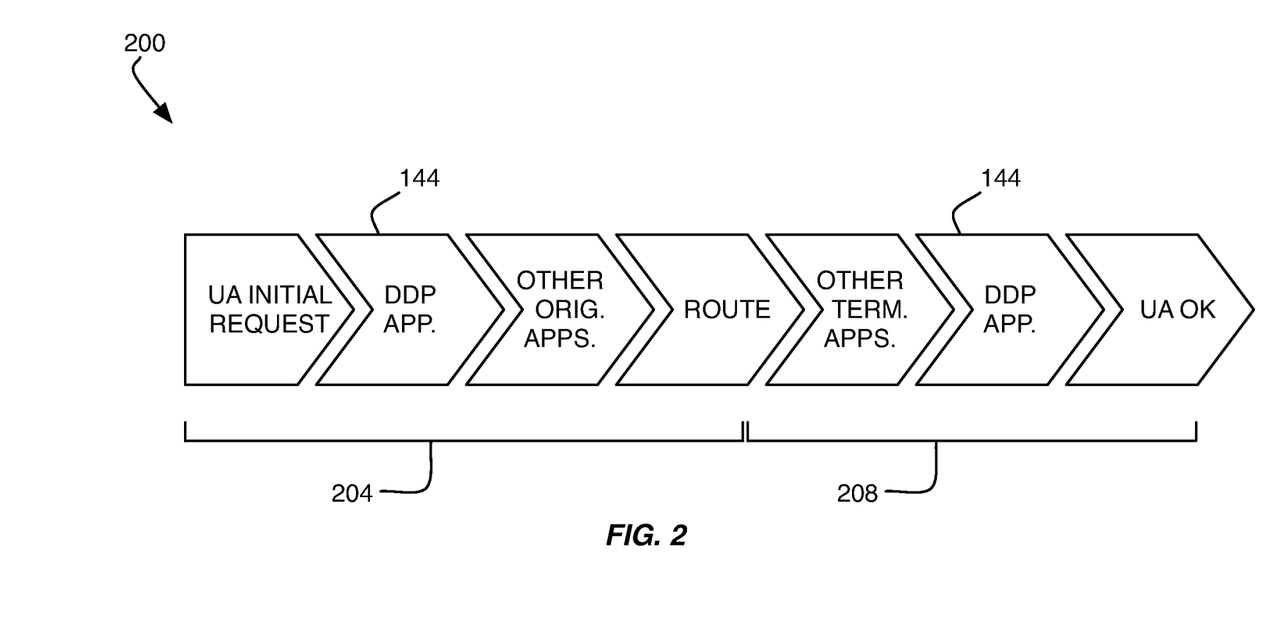
FIG. 2 is a diagram depicting an application sequence used in accordance with embodiments of the present disclosure.

With reference now to FIG. 2, additional details of an application sequence or call vector will be described in accordance with embodiments of the present disclosure. FIG. 2 depicts a call vector 200 for an outbound (e.g., call originated within an enterprise network 104) or inbound (e.g., call originated outside of an enterprise network 104) call. Specifically, the call vector 200 comprises an origination sequencing side (e.g., orig-sequence) 204 and a termination sequencing side (e.g., term-sequence) 208. The orig-sequence 204 may generally correspond to the application sequence that is created in accordance with a calling party's communication preferences as defined within user table 132. In other embodiments, the orig-sequence 204 may correspond to the application sequence predetermined for a particular communication device 136 (e.g., a communication device 136 identified as potentially a paired or media device). The term-sequence 208 may generally correspond to the application sequence that is created in accordance with a called party's communication preferences as defined within user table 132. In embodiments where the called or calling party corresponds to a user outside of the enterprise network or an unknown user, then one or more default application sequences may be invoked as appropriate.

In the depicted example, a DDP application 144 has been invoked for the calling party or, in some embodiments, for a predetermined device rather than a predetermined party or user. In some embodiments, the DDP application 144 may be configured to alter an identity associated with the calling device to correspond to an identity of a user operating a device that has been paired with the calling device. By altering the identity of the calling party in this fashion, the DDP application 144 will enable the call vector to change from that associated with a default or unknown user to that associated with a particular user. Thus, the particular user's application sequence preferences can be identified within the user table 132 and the appropriate origination applications can be invoked for the user even though the call was initiated at a device not originally associated with the user.

Ultimately, the DDP application 144 causes the calling party to change to that of a party operating a control device. Thus, the DDP application 204 is invoked after the initial UA request is received at the communication server 124 and prior to any other applications being sequenced on the orig-sequence side 204 of the call vector 200. The DDP application 144 is sequenced prior to the other origination applications on the call originated from the media device rather than the control device so that the DDP application is closest to the calling party's UA than any other applications, thereby ensuring that the features and functions provided by the DDP application operate successfully and are not interrupted by another application. As an example, if a recording application were provided between the UA and the DDP application 144, then the recording application would not get the audio from the paired device. Thus, the position of the DDP application 144 contributes, not only, to the proper functioning of the DDP application 144, but the position of the DDP application ensures that other applications work as anticipated despite the fact that the DDP application 144 is performing a dynamic device pairing function as described herein.

It should be noted that if there are any other orig-side applications that really must be executed on the behalf of the media device regardless of which user paired with it, those applications might be sequenced before the DDP application 144 in the orig sequence vector. The feature sequencer 228 may be configured to restart sequencing with the control user's identity as soon as the DDP application 144 is done with its job, so any applications after the DDP application 144 in the media device orig sequence would be skipped.

Similar to the orig-sequence, the called party term-side applications, which may or may not include a DDP application 144, can be sequenced into the call vector 200. It should be appreciated, however, that the called party does not necessarily need to have a DDP application 144 sequenced on their side of the call. In other embodiments, the calling party may not necessarily need to have a DDP application 144 and the call may be directed toward a media device (or user at a media device) and the only DDP application 144 in the call vector 200 may be on the term-side of the call vector 200.

In some embodiments, the DDP application 144 for the called party and/or calling party may be inserted into the call vector 200 via an anchor point server, such as is described in U.S. Patent Publication No. 2011/0289203 to Braudes et al., the entire contents of which are hereby incorporated herein by reference. Thus, it may not be necessary to explicitly sequence the DDP application 144 into the call vector 200 during call setup. Rather, an anchor point server may initially be sequenced into the call vector 200 at the appropriate location and then the DDP application may connect to the call at a later time via the anchor point server.

Figure 3:
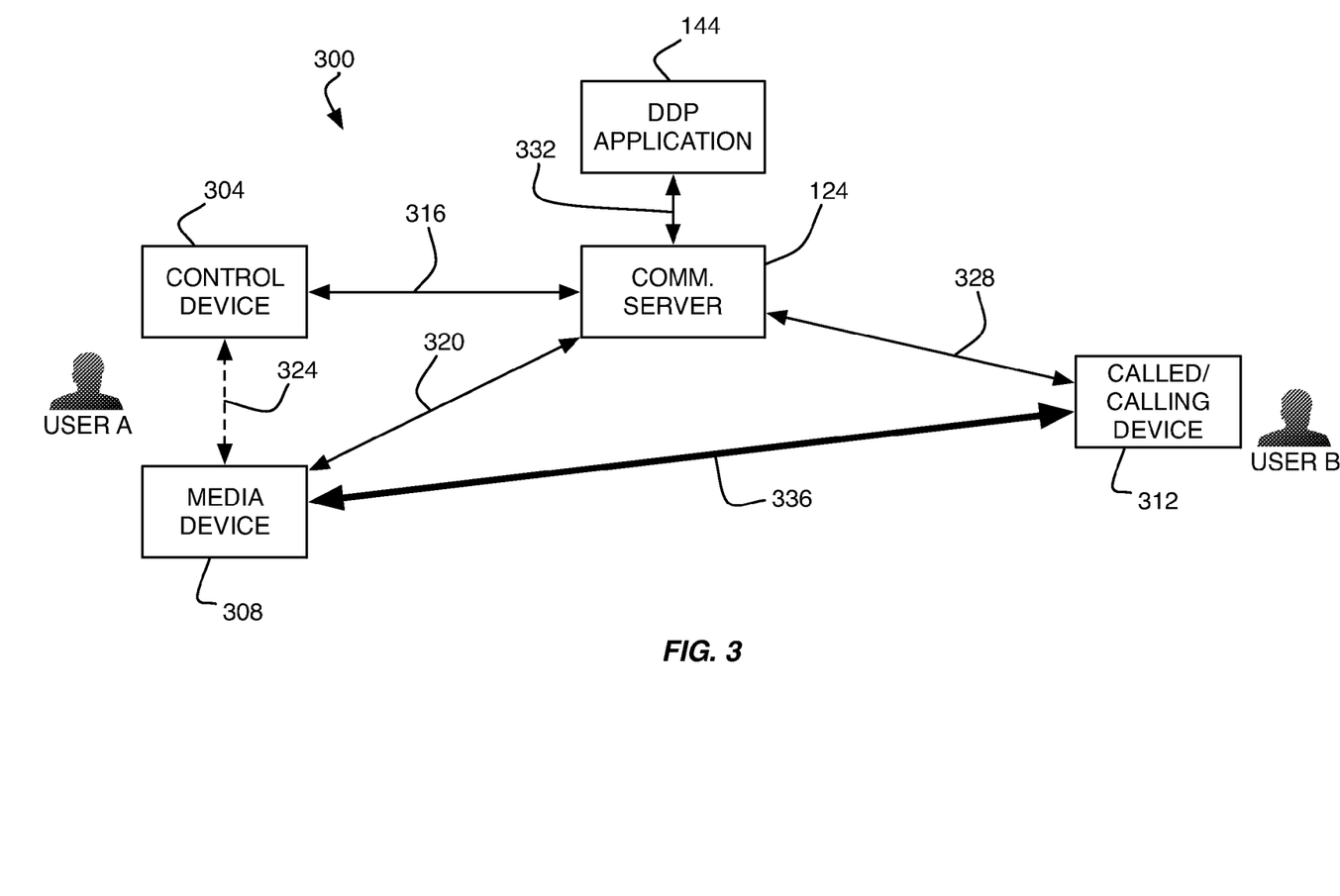
FIG. 3 is a diagram depicting a call topology created in accordance with embodiments of the present disclosure.
Figure 4:
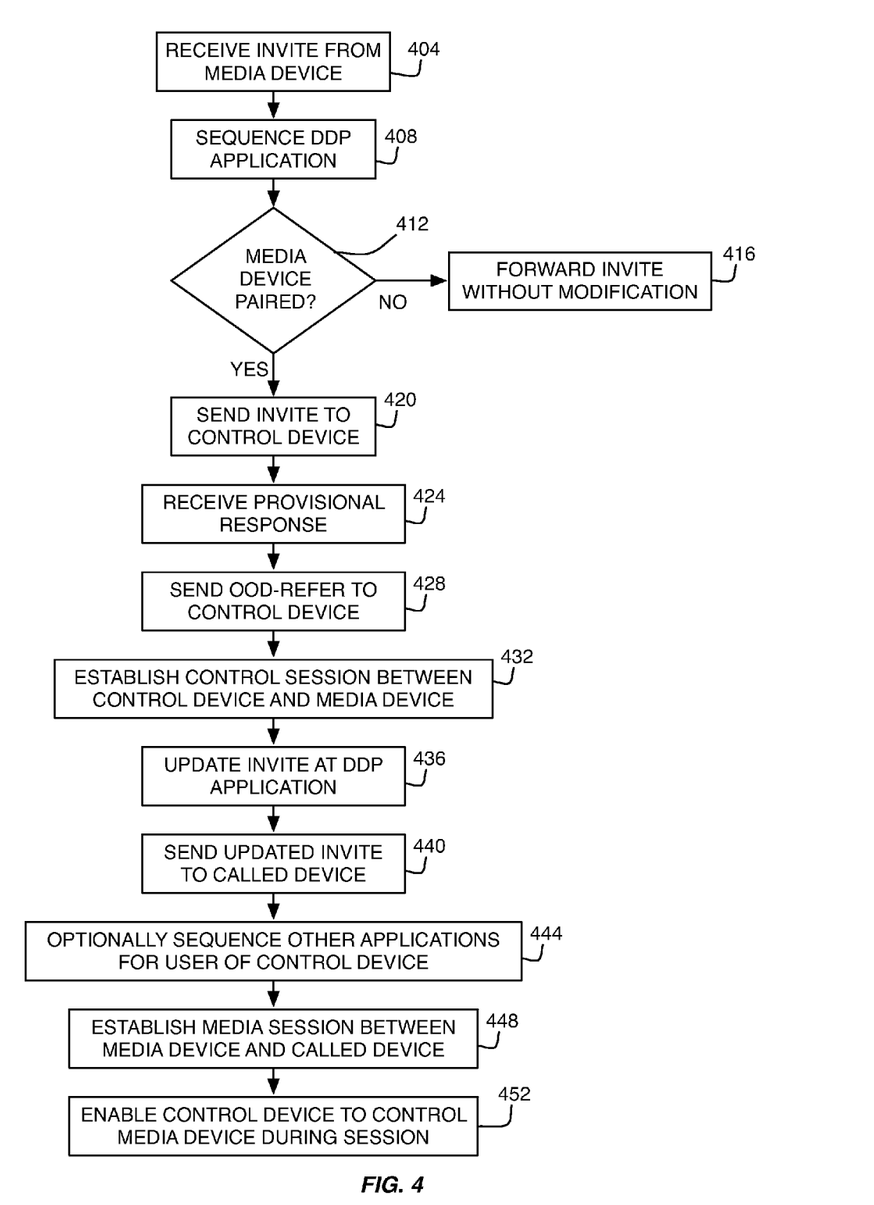
FIG. 4 is a flow chart depicting a first communication method in accordance with embodiments of the present disclosure.

With simultaneous reference now to FIGS. 3 and 4, a first communication method will be described in accordance with at least some embodiments of the present disclosure. Specifically, the communication method generally corresponds to a method of facilitating an outbound call for a calling user (e.g., User A). As can be seen in FIG. 3, User A may engage in a communication session using both a control communication device 304 and a media communication device 308. One or both devices 304, 308 may correspond to any type of communication device 112, 136 described herein above. Likewise, a called user (e.g., User B) may be operating a called device 312, which may be similar or identical to any of the communication devices 112, 136 described herein. In other words, the called device 312 can either be an external communication device 112 or an internal communication device 136.

The method begins when User A initiates a call at the media device 308 and the media device 308 transmits an INVITE message toward the called device 312 associated with User B (step 404). The INVITE message generated at the media device 308 may be initially received at communication server 124, which is responsible for sequencing the DDP application 144 (step 408). In some embodiments, the communication server 124 may be configured to sequence the DDP application 144 for any INVITE message received from the media device 312 (e.g., as a default action). In some embodiments, the communication server 124 may be configured to sequence the DDP application 144 for an INVITE if one or more other conditions are satisfied (e.g., the INVITE is received within a predetermined window of time, the INVITE is received when the media device 308 is operating in a particular mode, etc.).

In some embodiments, the communication server 124 may correspond to a communication server 124 that is authoritative for User A or it may correspond to a communication server 124 that is authoritative for the media device 308. Furthermore, the initial INVITE message may be transmitted via path 320, and the SDP Offer contained within the INVITE message may initially contain information that describes a profile of the media device 308. In other words, the INVITE message initially received at the communication server 124 from the media device 308 may not contain information identifying that User A initiated the call. Rather, the INVITE message may comprise information that describes the location or identity of the media device 308 (e.g., a predetermined conference room, a device name, a device identification number, etc.). More specifically, the INVITE message may contain an SDP offer from the media device 308 and has the media device caller ID associated therewith (e.g., containing PAI/From header of the media device 308).

The communication server 124, may first determine if any applications are required to be sequenced for the media device 308, regardless of whether or not the media device 308 is paired to a control device 304. For instance, rules may define that all calls on the media device 308 be recorded with a recording application. Thereafter, or in the event that no such applications are required to be sequenced for the media device 308, the communication server 1224, rather than preparing an entire origination sequence of applications based on the identity of the media device 308, invokes the DDP application 144 in step 408 to let the DDP application 144 determine if the media device 308 is paired to another device (e.g., control device 304) (step 412). In some embodiments, the DDP application 144 will check the INVITE to see if the PAI matches an address that User A has paired with. If the query of step 412 is answered negatively (e.g., no PAI match is identified), then the DDP application 144 provides the INVITE message back to the communication server 124 and the INVITE is processed and forwarded to the called device 312 without modification (step 416). In other words, if the DDP application 144 determines that the media device 308 which initiated the call is not paired to a control device 304, then the DDP application 144 will allow the INVITE to go to the called device 312 with an identification of the media device 308 (or a default identity associated therewith) as the calling party. This also allows the communication server 124 to process the origination sequence of applications in accordance with the default identity of the media device 308.

Referring back to step 412, if the DDP application 144 determines that the media device 308 is paired to another device (e.g., control device 304), then the DDP application 144 will begin the process of establishing a control session between the media device 308 and control device 304 to enable the control device 304 to exert at least some control over the call that will eventually be established between User A and User B. In particular, the DDP application 144 will cause a new INVITE message to be transmitted to the control device 304 (step 420). In some embodiments, this new INVITE message is transmitted via links 332 and 316 (e.g., back through the communication server 124). In other embodiments, the DDP application 144 may transmit the new INVITE message directly to the control device 304 via a direct link (not shown). In some embodiments, this new INVITE message may contain a special tag that indicates the INVITE is for a control link call to be established between control device 304 and media device 308. The new INVITE message may also contain an SDP of a=inactive, which means that no media will be established between the control device 304 and media device 308 for the control link call.

When the control device 304 receives the INVITE from the DDP application 144, the control device 304 may generate and send a provisional response (e.g., a 180 message) back to the DDP application 144 that includes a tag indicating that the control device 304 is DDP-capable (step 424). Upon receiving the provisional response from the control device 304, the DDP application 144 may generate and send an Out-of-Dialog Refer (OOD-REFER) message back to the control device 304 (step 428). Specifically, the OOD-REFER message may contain an "Answer Call" directive, which causes the control device to automatically answer the call upon receiving the OOD-REFER message. It should also be appreciated that instead of using an OOD-REFER message, the DDP application 144 may initially have sent the new INVITE with an auto-answer directive to the control device 304 in step 420.

When the control device 304 receives the OOD-REFER message (or specially-formatted INVITE message with an auto-answer directive), the control device 304 will answer the call and a control session is now established between the control device 304 and the media device 308 (step 432). This control session may be established over links 316 and 320 or it may be established via a dedicated control link 324.

Once the DDP application 144 has successfully established a control session between the control device 304 and media device 308, the DDP application 144 turns its attention back to the original INVITE received from the media device. In particular, the DDP application 144 may modify the original INVITE message such that the PAI/From header of the INVITE message is modified to contain the identity of the user at the control device 304 (e.g., User A) and the SDP offer from the media device (step 436). This means that the DDP application 144 now makes the call appear as though it was initiated by User A and is being controlled by User A at the media device 308.

After the INVITE message has been modified, the DDP application 144 transmits the modified INVITE message back to the communication server 124 to complete the origination sequence of applications and eventually forward the INVITE message along to the called device 312 (step 440). When the communications server 124 receives the modified INVITE message from the DDP application 144, the communication server 124 now recognizes that the call has been initiated by User A rather than a default identity associated with the media device 308. This enables the communication server 124 to refer to the user table 132 and sequence the appropriate applications in accordance with the preferences of User A (step 444).

Following the origination side processing of the call, the communication server 124 may pass the INVITE message to a communication server 124 authoritative for User B such that termination side processing can occur, if desired. Eventually, the INVITE message reaches the called device 312 via link 328 and a media session is established between the called device 312 and the media device 308 (step 448). In some embodiments, an RTP or SRTP stream is established via link 336 and media is allowed to flow directly between the devices 308, 312 while control signaling still traverses the applications and/or communication servers 124 via one or more of links 316, 320, 324, 328, and 332. Moreover, because of the control session established by the DDP application 144, User A is allowed to control at least some aspects of the communication session with the control device 304 even though the media is flowing between the media device 308 and called device 312 (step 452).

Figure 5:
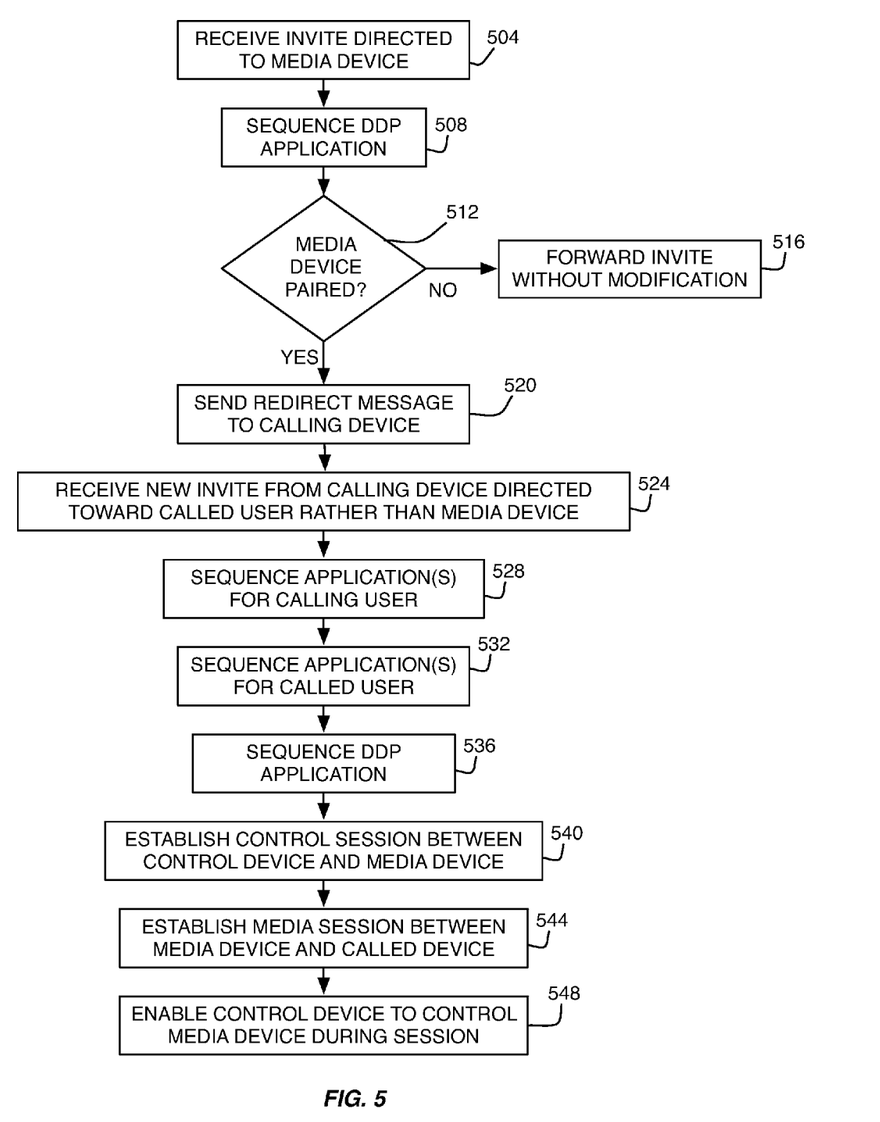
FIG. 5 is a flow chart depicting a second communication method in accordance with embodiments of the present disclosure.

With reference now to FIGS. 3 and 5, a second communication method will be described in accordance with at least some embodiments of the present disclosure. Specifically, the communication method generally corresponds to a method of facilitating an inbound call for a called user (e.g., User A) having a control device 304 potentially paired to a media device 308, where the inbound call is initiated by a calling user (e.g., User B) from a calling device 312.

The method begins when User B initiates a call with calling device 312 and the calling device 312 transmits an INVITE message toward User A and/or media device 308. A communication server 124 authoritative for User B may perform origination-side application sequencing, which may or may not follow the methods described in connection with FIG. 4. After origination-side processing has been completed, if any such processing was performed, the INVITE message is routed toward media device 308 and is received at the communication server 124 authoritative for the media device 308 (or a default user associated with the media device 308) (step 504). The communication server 124, upon receiving the INVITE message, may invoke one or more termination-side applications and then the DDP application 144 (step 508). In some embodiments, the communication server 124 may be configured to sequence the DDP application 144 for any INVITE message directed toward the media device 312 (e.g., as a default action). In some embodiments, the communication server 124 may be configured to sequence the DDP application 144 for an INVITE if one or more other conditions are satisfied (e.g., the INVITE is received within a predetermined window of time, the INVITE is received when the media device 308 is operating in a particular mode, etc.).

In some embodiments, the headers contained within the INVITE message may initially contain information that describes the media device 308 as the target and a user associated with the media device 308 as a target user. In other words, the INVITE message initially received at the communication server 124 from the calling device 312 may not contain information identifying that User A is the target of the call. Rather, the INVITE message may comprise information that describes the target as the media device 308 (e.g., by identifying a predetermined conference room, a device name, a device identification number, etc.). Once invoked by the communication server 124, the DDP application 144 is configured to determine if the media device 308 (e.g., the target device) is paired to another device (e.g., control device 304) (step 512). If the query of step 512 is answered negatively, then the DDP application 144 provides the INVITE message back to the communication server 124 and the INVITE is processed and forwarded to the media device 308 without modification (step 516). In other words, if the DDP application 144 determines that the media device 308, which is the target of the call, is not paired to a control device 304, then the DDP application 144 will allow the INVITE to go to the media device 308 without further processing. Referring back to step 512, if the DDP application 144 determines that the media device 308 is paired to another device (e.g., control device 304), then the DDP application 144 will begin the process of establishing a control session between the media device 308 and control device 304 to enable the control device 304 to exert at least some control over the call that will eventually be established between User A and User B. In particular, the DDP application 144 will cause a redirect message to transmitted back to the calling device 312 (step 520). In some embodiments, the redirect message may correspond to a SIP 302 "Moved Temporarily" message. The redirect message causes the calling device 312 to generate and send a new INVITE message, where the new INVITE message is directed toward User A (e.g., identifies a target as User A's AOR) rather than identifying the media device 308 as the target device.

This new INVITE message may then be received back at the communication server 124 (step 524). Upon receiving the new INVITE message, the communication server 124 may sequence one or more applications anew for User B (step 528). Thereafter, the communication server 124 may begin term-sequencing applications for User A (step 532). As a part of sequencing applications for User A (e.g., the called user), the communication server 124 may eventually sequence the DDP application 144 again, possibly at the end of the term-sequence vector (step 536).

Once invoked the DDP application 144 may perform its typical functions to extend the new INVITE to both the control device 304 and the media device 308. This eventually causes a control session or control link 320 to be established between the control device 304 and media device 308, similar to the manner in which the control session was established in FIG. 4 (step 540).

Once the DDP application 144 has successfully established a control session between the control device 304 and media device 308, the DDP application 144 turns its attention back to the original INVITE received from the calling device 312. In particular, the DDP application 144 may be configured to specially mark INVITEs that it sends to the media device 304 so that it can avoid taking action when it is sequenced on the behalf of the media device 304. The special marking would have been on the control link INVITE (i.e., the new INVITE sent by the DDP application 144). In particular, this logic is executing from the point of DDP application 144 sequenced on the behalf of the media device 308 so it wouldn't need to be sequenced again for the link 320 between the media device 308 and control device 304.

Eventually and potentially after the INVITE message has been modified, the DDP application 144 transmits the modified INVITE message back to the communication server 124 to forward to the media device 308 so as to establish a media session between the media device 308 and the calling device 312 (step 544). In some embodiments, an RTP or SRTP stream is established via link 336 and media is allowed to flow directly between the devices 308, 312 while control signaling still traverses the applications and/or communication servers 124 via one or more of links 316, 320, 324, 328, and 332. Moreover, because of the control session established by the DDP application 144, User A is allowed to control at least some aspects of the communication session with the control device 304 even though the media is flowing between the media device 308 and called device 312 (step 548).

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method of facilitating a communication session between a first user and a second user, the method comprising:
    receiving a first call-establishment message, the first call-establishment message being at least one of generated by and directed toward a media device;
    in response to receiving the first call-establishment message, determining that the media device is paired with a control device associated with the first user;
    temporarily establishing a control link call between the media device and the control device; and
    enabling the media device to be controlled by the control device via the control link call while the media device exchanges media with a communication device operated by the second user, wherein the control link call is established by transmitting a second call-establishment message to the control device, the second call-establishment message corresponding to a type of message that enables the control device to establish a media session to itself.

2. The method of claim 1, wherein the second call-establishment message is transmitted to the control device with a Session Description Protocol (SDP) Offer containing a parameter of inactive.

3. The method of claim 2, further comprising:
transmitting an Out-Of-Dialog REFER (OOD-REFER) message to the control device to establish the control link call.

4. The method of claim 3, wherein the OOD-REFER message comprises an answer call directive.

5. The method of claim 1, wherein the first call-establishment message comprises an INVITE message and the second call-establishment message comprises an INVITE message.

6. The method of claim 1, wherein the media device generated the first call-establishment message, wherein determining the media device is paired with the control device comprises comparing an asserted identity of the media device with a list of control devices that are paired with media devices.

7. The method of claim 6, further comprising:
modifying the first call-establishment message to comprise an asserted identity of the first user; and
sequencing one or more applications in accordance with preferences of the first user.

8. The method of claim 1, wherein the first call-establishment message is directed toward the media device.

9. The method of claim 8, further comprising:
transmitting a redirect message back to the communication device operated by the second user, the redirect message causing the communication device operated by the second user to generate and transmit a new INVITE message that targets the first user rather than the media device;
receiving the new INVITE message from the communication device operated by the second user; and
sequencing one or more applications on behalf of the first user based on information contained in the new INVITE message.

10. The method of claim 1, wherein the control link call is terminated when a media channel between the communication device operated by the second user and the media device is terminated.

11. The method of claim 1, wherein the media exchanged between the media device and the communication device operated by the second user comprises at least one of audio, video, and text and wherein the media is exchanged via at least one of a Realtime Transport Protocol (RTP) session and Secure RTP (SRTP) session.

12. A non-transitory computer-readable medium comprising processor-executable instructions that are executable by a processor to facilitate a communication session between a first user and a second user, the instructions comprising:
instructions configured to receive a first call-establishment message, the first call-establishment message being at least one of generated by and directed toward a media device;
instructions configured to, in response to receiving the first call-establishment message, determine that the media device is paired with a control device associated with the first user; and
instructions configured to enable a temporary establishment of a control link call between the media device and the control device, thereby permitting the media device to be controlled by the control device via the control link call while the media device exchanges media with a communication device operated by the second user, wherein the control link call is established by transmitting a second call-establishment message to the control device, the second call-establishment message corresponding to a type of message that enables the control device to establish a media session to itself.

13. The computer-readable medium of claim 12, wherein the second call-establishment message is transmitted to the control device with a Session Description Protocol (SDP) Offer containing a parameter of inactive.

14. The computer-readable medium of claim 13, the instructions further comprising:
instructions configured to transmit an Out-Of-Dialog REFER (OOD-REFER) message to the control device to establish the control link call.

15. The computer-readable medium of claim 14, wherein the OOD-REFER message comprises an answer call directive.

16. The computer-readable medium of claim 12, wherein the first call-establishment message comprises an INVITE message and the second call-establishment message comprises an INVITE message.

17. The computer-readable medium of claim 12, wherein the media device generated the first call-establishment message, wherein determining the media device is paired with the control device comprises comparing an asserted identity of the media device with a list of control devices that are paired with media devices.

18. The computer-readable medium of claim 17, the instructions further comprising:
instructions configured to modify the first call-establishment message to comprise an asserted identity of the first user; and
instructions configured to sequence one or more applications in accordance with preferences of the first user.

19. An application server, comprising:
a processor; and
memory including a dynamic device pairing application in the form of processor-executable instructions, the dynamic device pairing application configured to, when executed by the processor, dynamically pair a control device and a media device for a first user during a communication session with a second user operating a third communication device, the dynamic device pairing application configured to receive a first call-establishment message, the first call-establishment message being at least one of generated by and directed toward a media device, in response to receiving the first call-establishment message, determine that the media device is paired with a control device associated with the first user, and then enable a temporary establishment of a control link call between the media device and the control device, thereby permitting the media device to be controlled by the control device via the control link call while the media device exchanges media with a communication device operated by the second user, wherein the control link call is established through the application server in response to the application server receiving a Session Initiation Protocol (SIP) message having one or more parameters that cause the control link call to be established instead of causing media to be delivered to the control device.

20. The application server of claim 18, wherein the SIP message comprises a Session Description Protocol (SDP) Offer containing a parameter of inactive and wherein the dynamic device pairing application is further configured to transmit an Out-Of-Dialog REFER (OOD-REFER) message to the control device to establish the control link call, the OOD-REFER message comprising an answer call directive.

* * * * *